United States Patent
Lang et al.

(10) Patent No.: US 6,352,348 B1
(45) Date of Patent: Mar. 5, 2002

(54) LOW VIBRATION MIRROR ASSEMBLY

(75) Inventors: Heinrich Lang, Ergersheim; Wolfgang Seiboth, Bad Windssheim; Stefan Centmayer, Ergersheim, all of (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 09/741,770

(22) Filed: Dec. 19, 2000

(30) Foreign Application Priority Data

Sep. 1, 2000 (DE) .................................... 200 15 092 U

(51) Int. Cl.[7] .............................................. G02B 7/182
(52) U.S. Cl. ........................ 359/881; 359/882; 359/883; 359/862
(58) Field of Search ................ 359/881, 882, 359/883, 862, 865, 866, 871, 872, 877, 601, 603; 248/490, 491, 493, 495

(56) References Cited

U.S. PATENT DOCUMENTS

| 3,508,815 A | 4/1970 | Scheitlin et al. |
| 3,644,022 A | 2/1972 | Jagdt et al. |
| 4,701,037 A | 10/1987 | Bramer |
| 5,031,871 A | 7/1991 | Ohta et al. |
| 5,604,644 A | 2/1997 | Lang et al. |
| 5,621,577 A | 4/1997 | Lang et al. |
| 5,691,849 A | * 11/1997 | Ledroit et al. ............... 359/603 |
| 5,793,530 A | 8/1998 | Lang |
| 5,925,272 A | 7/1999 | Lang et al. |
| 6,217,181 B1 | * 4/2001 | Lynam et al. ............... 359/879 |

FOREIGN PATENT DOCUMENTS

| DE | 4010083 A1 | 10/1991 |
| DE | G9108483 | 1/1992 |
| DE | 0865967 A2 | 9/1998 |
| EP | 0659609 | 1/1999 |

OTHER PUBLICATIONS

USSN 09/266,987, filed Mar. 12, 1999, equivalent to German Patent Application No. 198 40 004.7, filed Sep. 02, 1998.
USSN 09/045,098, filed Mar. 20, 1998, equivalent to EP 0 865 967.
Verified English language translation of G 9 108 483.

* cited by examiner

*Primary Examiner*—Mohammad Sikder
(74) *Attorney, Agent, or Firm*—Dority & Manning, P.A.

(57) ABSTRACT

A rearview mirror assembly for a vehicle having a mirror element attached to a carrier plate is disclosed. Also disclosed is a method of assembling a rearview mirror assembly with an exchangeable mirror element.

24 Claims, 7 Drawing Sheets

LOW VIBRATION MIRROR ASSEMBLY

FIELD OF INVENTION

The invention concerns a mirror assembly with a mirror pane and mirror carrier plate, especially for outside rearview mirrors for motor vehicles, and the invention concerns also a rearview mirror with such an assembly.

BACKGROUND OF THE INVENTION

EP-0 659 609 discloses a rearview mirror, which encompasses a mirror element releaseably fastened in a housing. The mirror element has a mirror pane and mirror carrier plate. In this case, the mirror pane is adhesively affixed to the mirror carrier plate over its entire surface.

When such mirror elements are installed as outside mirrors in trucks, very frequently strong vibrations occur, which, in an extreme instance, can lead to the separation of the mirror pane from the carrier plate. In other words, extreme vibrations in these types of mirror elements can cause a deterioration of the optical qualities.

SUMMARY OF THE INVENTION

Thus, the present invention makes available a mirror element, particularly for outside, rearview service on commercial vehicle of which is less subject to vibration disturbances, This achievement is accomplished through the features of the invention.

By the fact that the mirror carrier plate possesses at least one unobstructed opening, the mirror pane cannot lie in full surface contact on the carrier. The mirror pane on that account is partially freed from the mirror carrier plate as far as vibrations are concerned. Because of the cutouts, a lighter mirror carrier plate is also achieved. This contributes to making the entire system lighter.

In accord with an advantageous embodiment of the invention, the mirror pane lies upon spacers, so that the mirror pane contacts the carrier plate only from point to point, i.e., from spacer to spacer, and as a consequence, is further freed from contact with the surface of the plate. In the intervening space defined by the spacers between the mirror carrier plate and the mirror pane, a coating of adhesive material is applied, which assures a retentive connection between the mirror pane and the carrier plate. Due to the elasticity and plasticity of the adhesive layer, vibration is scarcely communicated to the mirror pane.

In accord with yet another advantageous embodiment of the invention, the unobstructed openings are so placed in the mirror carrier plate that a peripheral edge area of the mirror carrier plate remains, which provides greater stability.

Following yet another advantageous embodiment of the invention, a plurality of unobstructed openings are provided, which are apportioned over the mirror carrier plate. By means of this plurality of the openings, the characteristic frequency of the mirror carrier plate, i.e., the entire mirror system, is influenced. This provides another tool for the reduction of tendencies toward vibration.

Yet another embodiment provides the advantage that the area of the openings are within 10% to 70%, preferably 15% to 50%, of the entire area of the mirror pane. By these means, stability of a sufficient order is established, and the positive effect in regard to a better vibration relationship is still achieved.

In accord with another advantageous embodiment of the invention, openings are of different sizes, whereby the vibration characteristics can be specifically influenced.

In accord with yet another advantageous embodiment, centrally located openings, i.e., penetrative cutouts, which are shaped as circular sectors are provided. Between the sectors run webs which are the equivalent of spokes converging at a central hub. At the central hub is located the boss, or molding head, of the cast carrier plate. This embodiment improves the flow characteristics of the low viscosity plastic during the production of the plate in the injection molding process.

In the rearview mirror in accord with one aspect of the invention, the mirror element is affixed to the housing, and the housing itself, in turn, is position-adjustably fastened to a holder. A rearview mirror may be fastened on a holder, which is equipped with a positioning device.

BRIEF DESCRIPTION OF THE DRAWINGS.

Further details, features and advantages of the invention are to be inferred from the following description of preferred embodiments as shown in drawings.

There is shown in.

DETAILED DESCRIPTION OF THE DRAWINGS

Figure 1:
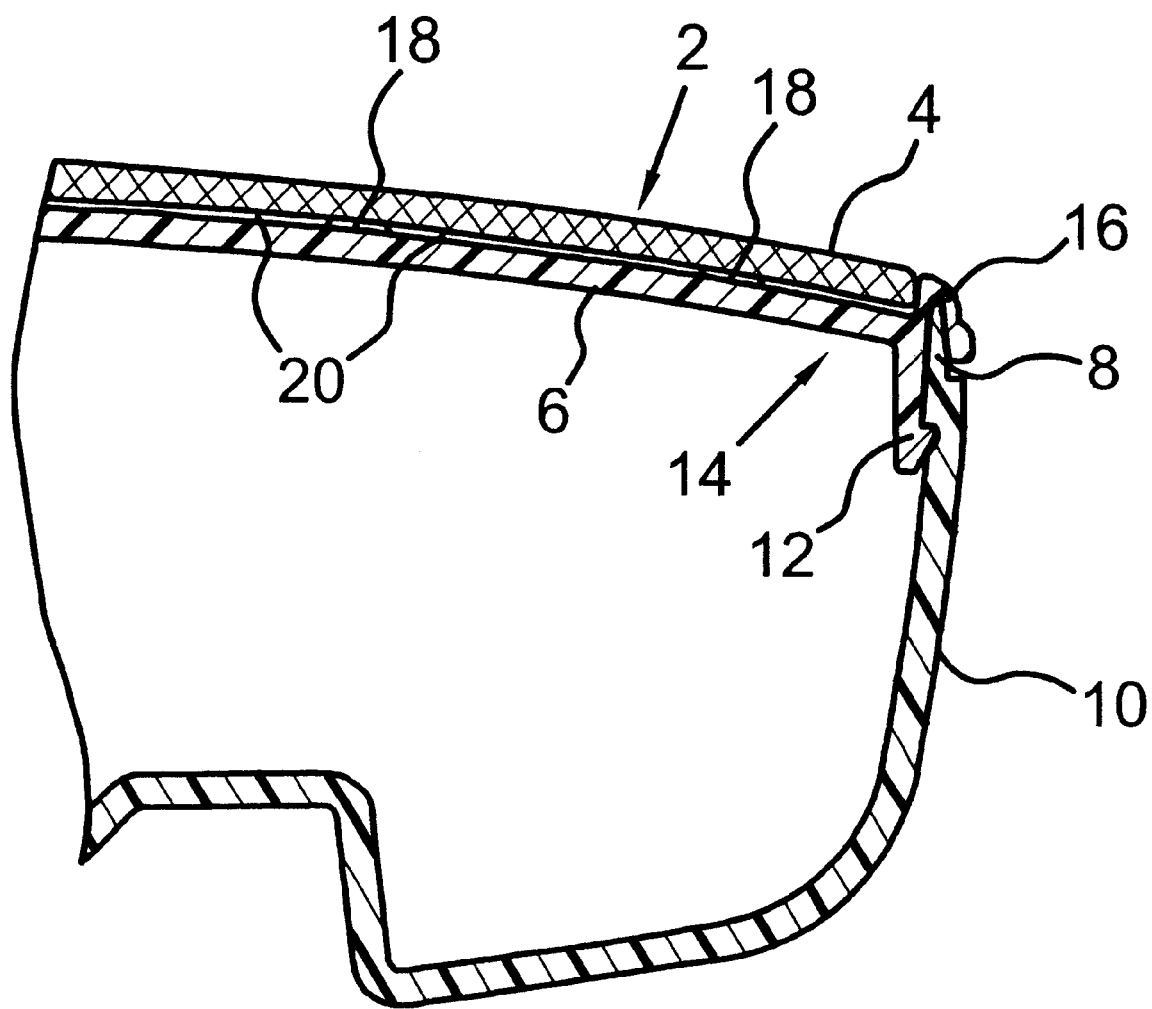
FIG. 1 a cross-sectional, top view of a first embodiment of a rearview mirror in accord with the invention in which a mirror element is fastened by retaining elements to a housing-rim of a rearview mirror housing, FIG. 2 a cross-sectional, top view of a second embodiment of a rearview mirror in accord with the invention in which a mirror element is secured on the inside of a rear housing wall, FIG. 3 a front view of a mirror carrier plate of an embodiment of a mirror element with a central opening, FIG. 4 a sectional view through the section line A—A of FIG. 3 of the embodiment with the mirror element installed, FIG. 5 a sectional view through the section line B—B of FIG. 3 of the embodiment with the mirror element installed, FIG. 6 a front view of a mirror carrier plate in accord with a second embodiment of a mirror element with an opening, and FIG. 7 a front view of a mirror carrier plate in accord with a third embodiment of a mirror element with an opening.

Detailed reference will now be made to the drawings in which examples embodying the present invention are shown. The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as a limitation of the invention. The present invention thus includes any modification and variations of the following examples as come within the scope of the appended claims and their equivalents.

FIG. 1 shows a first embodiment of the invention, in which an invented mirror element 2 (i.e., a mirror assembly) having a mirror pane 4 and a mirror carrier plate 6 is fastened at the rim 8 of rearview mirror housing 10 by means of catch elements 12. The catch elements 12 are of one piece construction formed by molding in the edge zone 14 of the mirror carrier plate 6.

The mirror carrier plate 6 possesses in the edge zone 14, in a lengthening of the catch element 12, a peripherally running groove 16 into which the rim 8 of the mirror housing engages. By these means, the interior of the mirror housing 10 is sealed off against surrounding ambient conditions. Also by means of this coupling, a tight coupling is produced between the mirror housing 10 and the mirror element 8. With this type of coupling, if conventional mirror elements had been used, vibrations from the vehicle would be transmitted through the mirror housing 10 to the mirror element 2.

Molded onto the mirror carrier plate 6 are raised spacers 18, on top of which the mirror pane 4 lies. Because of the spacers 18 between the mirror pane 4 and the mirror carrier plate 6, an intervening space exists which is filled with an adhesive layer 20. This adhesive layer 20 forms a bond between the mirror pane 4 and the carrier plate 6.

Figure 2:
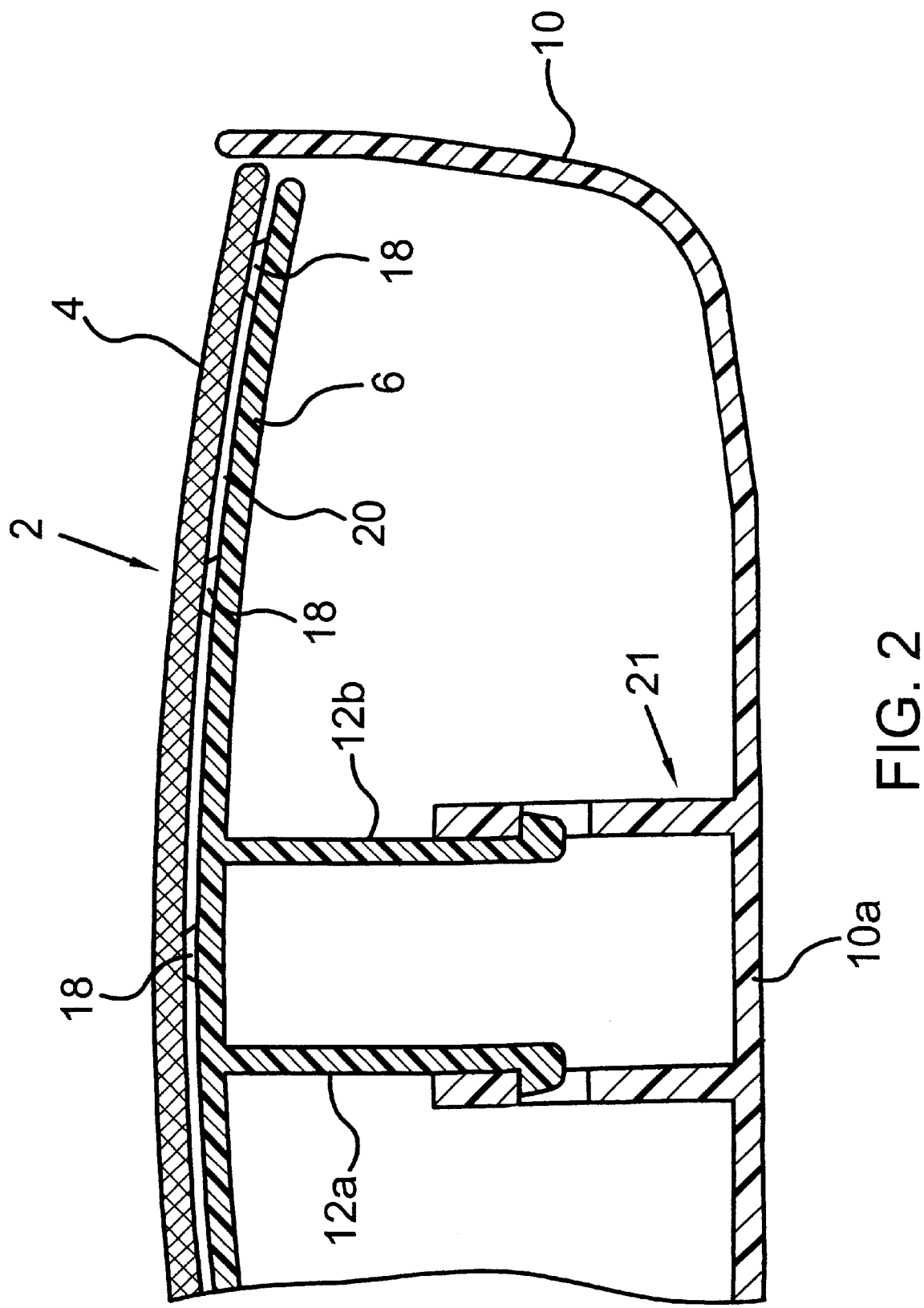

FIG. 2 shows a second embodiment of the invention in which the mirror element 2 is secured by means of the catch elements 12a, 12b on a retaining means 21 which extends inward from the back side 10a of the mirror housing 10.

Various alternatives for mirror element 2, which are shown as installed in the embodiments of FIG. 1 and FIG. 2, will be described below with the aid of FIGS. 3 to 7.

Figure 3:
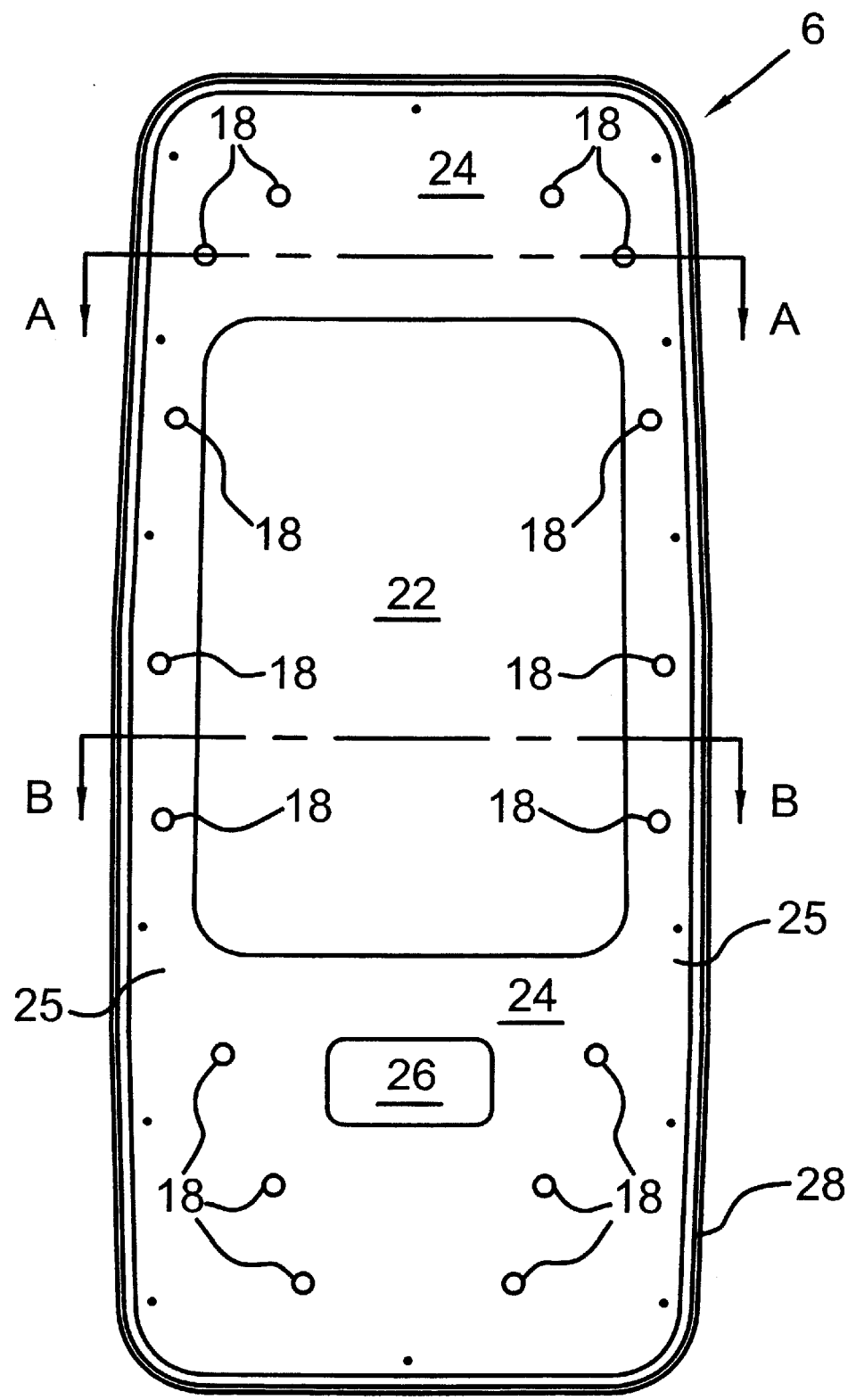
Figure 4:
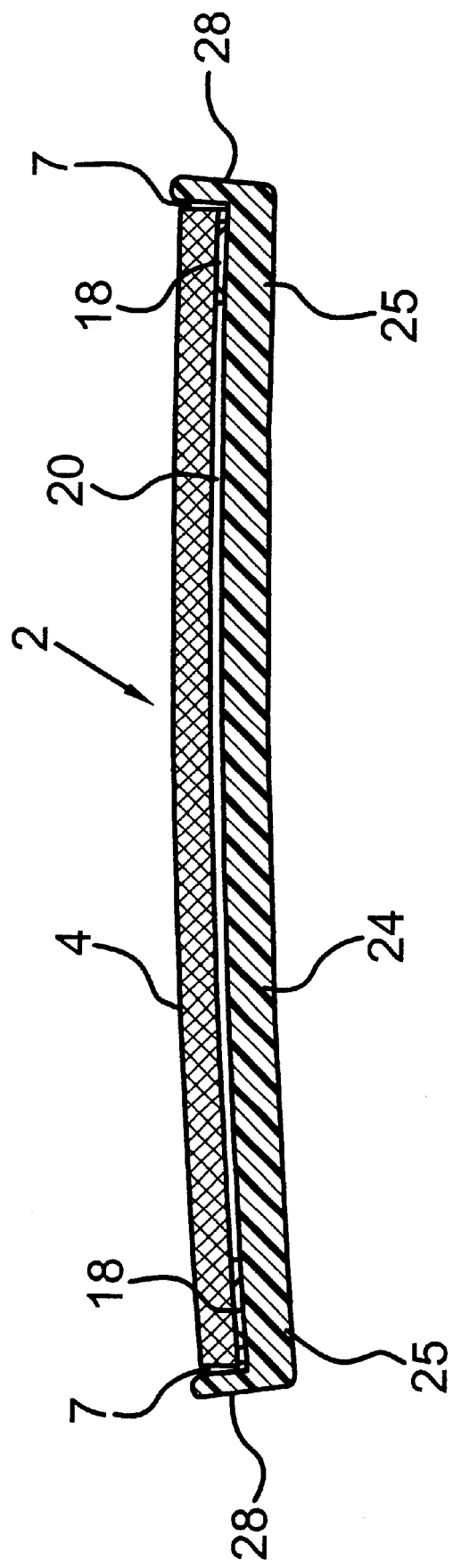
Figure 5:
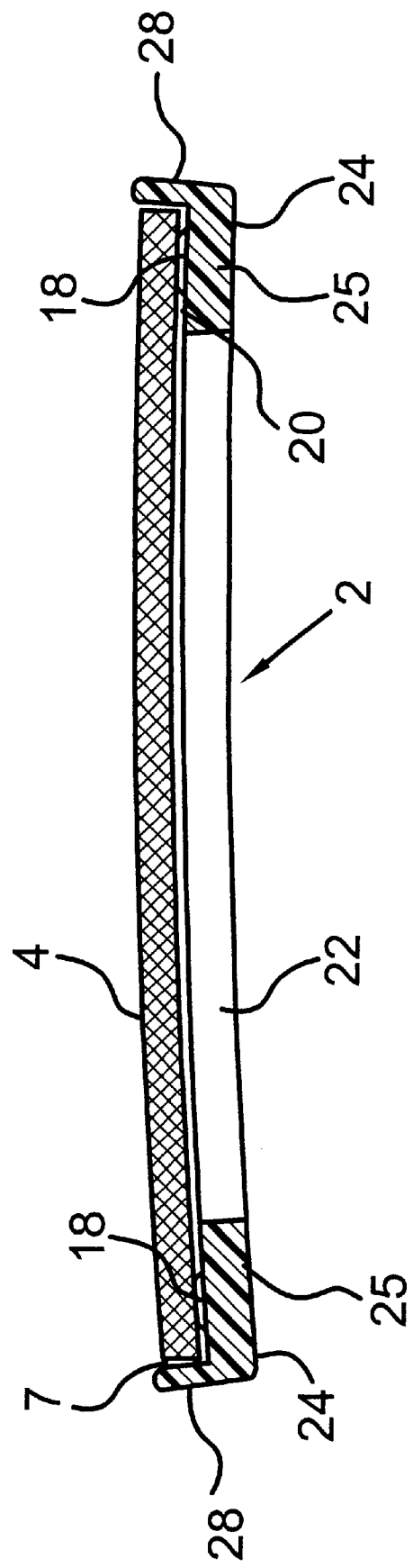

FIGS. 3 to 5 show a first embodiment of a mirror element in accord with the present invention. FIG. 3 depicts a plan view of the mirror carrier plate 6. The mirror carrier plate 6 possesses a central, unobstructed opening 22, so that mirror pane 4 (not shown in FIG. 3) lies in contact with the mirror carrier plate 6 only in the remaining contact area 24. The contact area 24 includes a closed, peripheral area 25 of the carrier plate 6 around the opening 22. The spacers 18 are located in the contact area 24 upon which the mirror pane 4 rests. Through a second opening 26, electrical connections for a mirror heating can be introduced through the mirror carrier plate 6.

The FIGS. 4 and 5 show, respectively, sectional presentations of the first embodiment of the mirror element 2.

FIG. 4 shows the section along the line A—A in FIG. 3 and FIG. 5, the section along the line B—B in FIG. 3. In the sectional drawings of the FIGS. 4, 5 the mirror element 2 is shown, whereas in FIG. 3 only the mirror carrier plate is depicted. The mirror carrier plate 6 in FIG. 3 possesses on its outer edge a peripheral rim 28, so that the mirror pane 6 is seen to lie in a recess 7 in the mirror carrier plate 6 supported by spacers 18.

Figure 6:
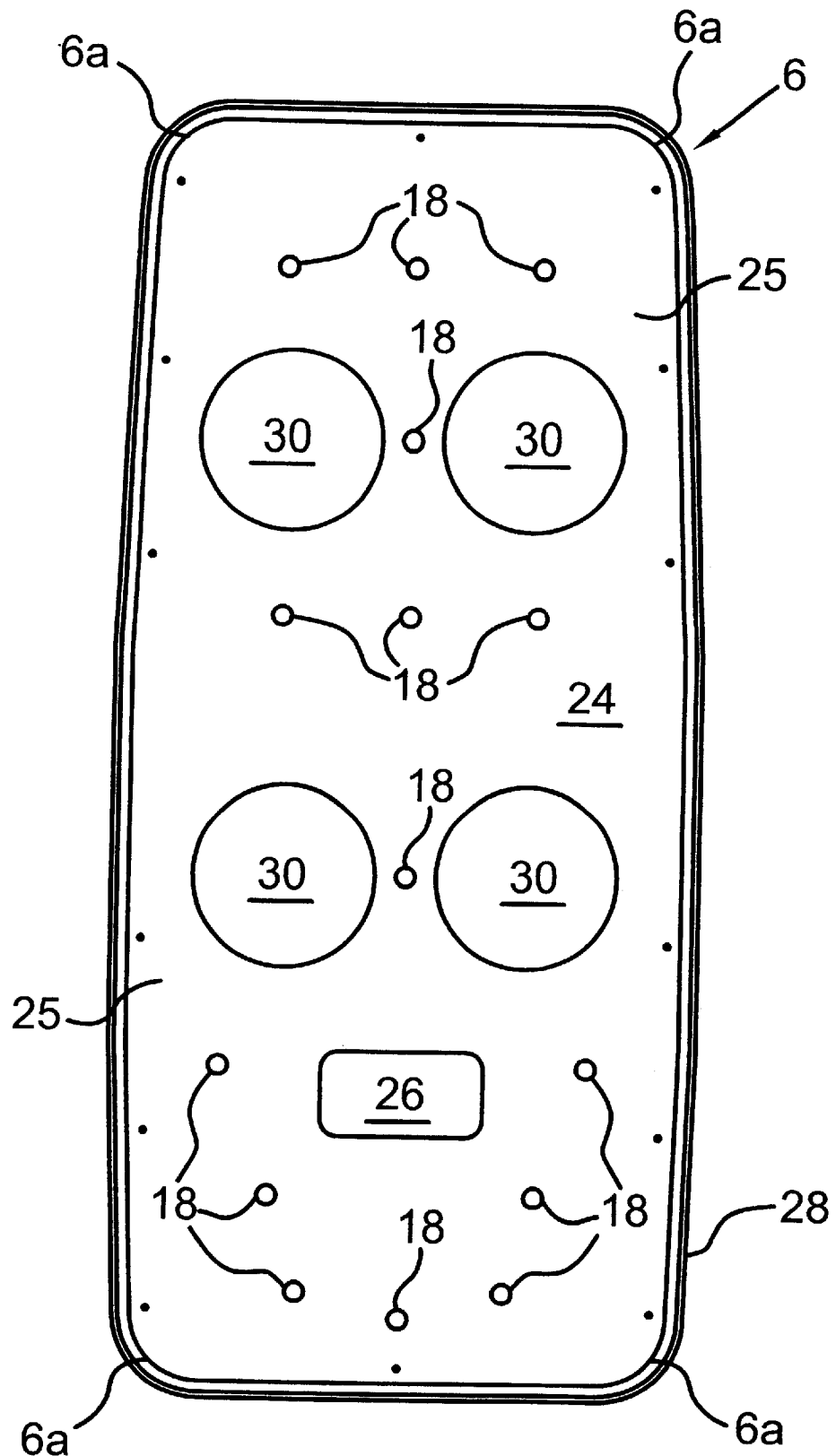

FIG. 6 shows a mirror carrier plate 6 of a second embodiment of the mirror element 2, in accord with the present invention, in which four, unobstructed, circular openings 30 are placed symmetrically and rectangularly with respect to each other. At the same time, once again the opening 26 is provided for electrical connections. The remaining build-up of the mirror element 2 represents the previously described forms of construction.

Figure 7:
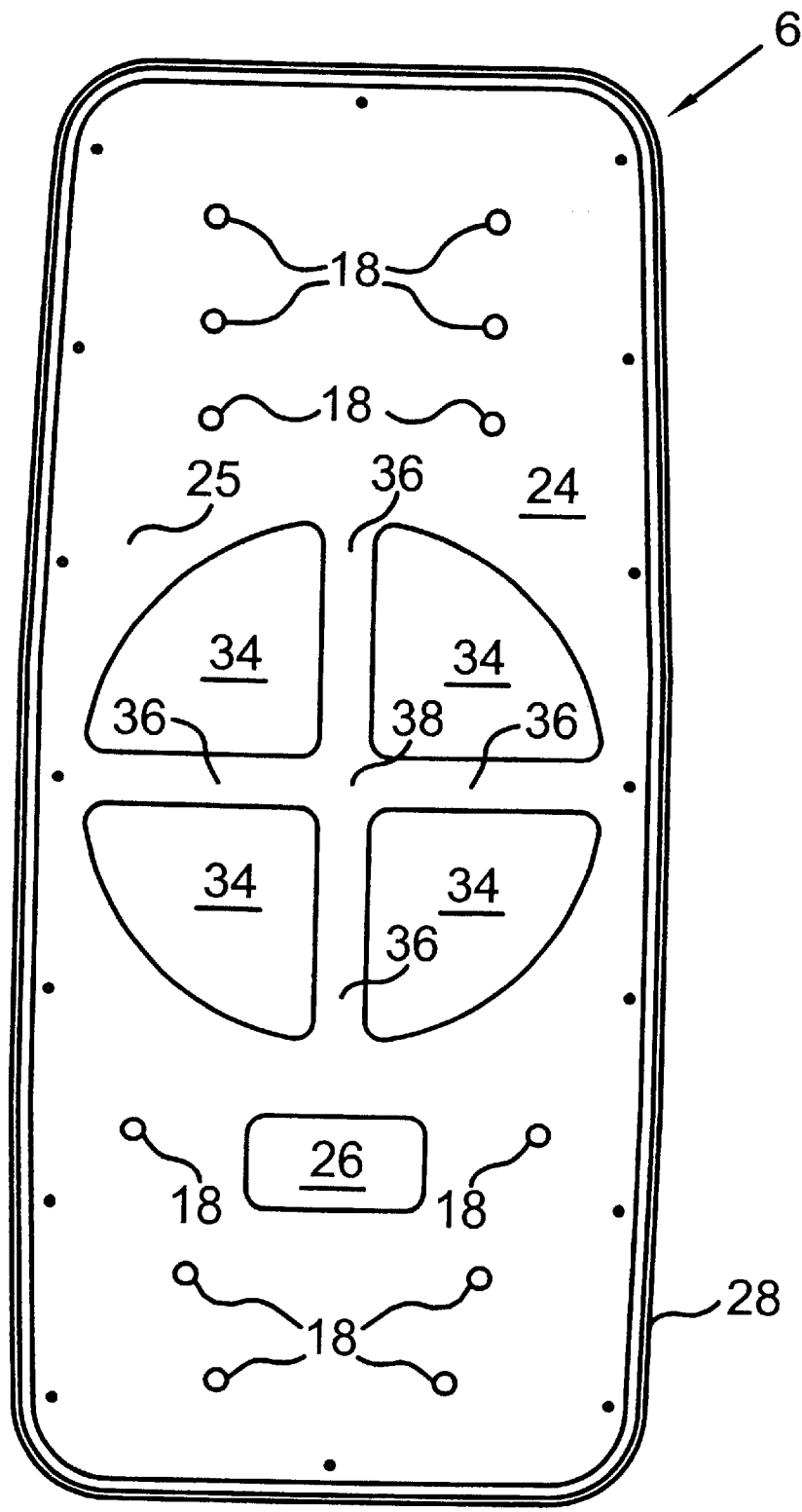

FIG. 7 shows the mirror carrier plate 6 of a third embodiment of the invention in which four circular sector shaped openings 34 are centrally located. The four circular sector shaped openings 34 are so arranged centrally above the opening 26 that their combined appearance is of a circular opening with four sectors 34. The four sector openings 34 are separated by cross shaped running spoke-like webs 36 with a central hub 38. During production of the mirror carrier plate 6, the hub 38 formed the molding inlet opening for the mirror carrier plate 6.

It will be apparent to those skilled in the art that various modifications and variations can be made in the present invention without departing from the scope and spirit of the invention. For example, specific shapes of various elements of the illustrated embodiments may be altered to suit particular applications. The present invention is intended to include such modifications and variations as come within the scope of the appended claims and their equivalents.

What is claimed is:

1. A rearview mirror assembly for a vehicle, the rearview mirror assembly comprising:

a carrier plate defining a first surface and an attachment piece having a groove, the carrier plate defining at least one opening through the first surface and a contact area disposed on the first surface around the opening, the attachment piece disposed substantially in a direction away from the at least one opening;

a housing having a receiving rim portion and an adjoining section, the receiving rim portion attachable to the carrier plate and disposed in a direction away from the adjoining section, the adjoining section attachable to the vehicle, the groove and the receiving rim portion operable to achieve a releasable snap-fit; and a mirror pane defining a second surface secured to the first surface via the contact area, the second surface being larger in area than the contact area.

2. The rearview mirror assembly of claim 1, wherein the carrier plate defines an additional opening therethrough for receipt of an electrical connection.

3. The rearview mirror assembly of claim 1, wherein the attachment piece and the receiving portion are located about an outer periphery of each of the carrier plate and the housing.

4. The rearview mirror assembly of claim 1, wherein the attachment piece and the receiving rim portion are located at a central portion of each of the carrier plate and the housing.

5. The rearview mirror assembly of claim 1, wherein the opening has an area of 10% to 70% of a surface area of the second surface.

6. The rearview mirror assembly of claim 1, wherein the opening has an area of 15% to 50% of a surface area of the second surface.

7. The rearview mirror assembly of claim 1, wherein the carrier plate includes at least one contact element disposed on the contact area, the mirror pane being affixed to the contact element.

8. The rearview mirror assembly of claim 7, wherein the contact element is a spacer.

9. The rearview mirror assembly of claim 7, wherein the contact element is a plurality of spacers.

10. The rearview mirror assembly of claim 1, further comprising a bonding layer adhesively disposed between the mirror pane and the carrier plate.

11. The rearview mirror assembly of claim 10, wherein the carrier plate has a contact area, the bonding layer adhesively contacting the contact area.

12. The rearview mirror assembly of claim 1, wherein the carrier plate defines a plurality of openings therethrough.

13. The rearview mirror assembly of claim 12, wherein at least one of the plurality of openings is sized differently than at least one of the other of the plurality of openings.

14. The rearview mirror assembly of claim 12, wherein the plurality of openings is distributed over the first surface of the carrier plate.

15. The rearview mirror assembly of claim 12, wherein the plurality of openings defines a sectored circle, a respective one of the plurality of openings forming a respective one of a sector in the circle.

16. The rearview mirror assembly of claim 15, further comprising a web disposed between any respective two of the sectors in the circles.

17. The rearview mirror assembly of claim 16, wherein the web converges at a center of the sectored circle to form a hub.

18. A mirror element for replaceable installation in a mirror assembly including a housing, the mirror element comprising:

a carrier plate having at least one opening therethrough;

a mirror pane attached to the mirror carrier plate; and an attachment element defining a groove and a catch element disposed at a distal edge zone of the carrier plate remote from a vehicle, the groove and the catch element configured to replaceably attach the carrier plate to the housing having a rim configured to match the groove such that the housing releasably holds the carrier plate.

19. The mirror element of claim 18, wherein the carrier plate has a peripherally disposed rim, an edge zone, and a recess formed by the rim and edge zone, the edge zone, the rim, and the recess configured to hold the mirror pane to the carrier plate.

20. The mirror element of claim 18, wherein the carrier plate has a contact element and a contact area, the contact element affixed in the contact area and configured to hold the mirror pane.

21. The mirror element of claim 20, further comprising an adhesive layer adhesively disposed between the contact area and the mirror pane.

22. A method of assembling a rearview mirror assembly for a vehicle, the assembly having a housing defining a receiving rim portion and an exchangeable mirror element with a carrier plate and a mirror pane, the method comprising the steps of:

a) providing the carrier plate with a contact area and an opening therethrough, the carrier plate having at least one catch element disposed substantially in a direction away from the opening, the at least one catch element and receiving rim portion operable to releasably attach the carrier plate to the housing;

b) providing the mirror pane for attachment to the carrier plate;

c) bonding the mirror pane to the contact area with an adhesive; and d) attaching the carrier plate to the housing with the at least one catch element.

23. The method of claim 22, further comprising the substeps of providing an additional opening through the carrier plate in step a) and routing an electrical connection through the additional opening to the mirror assembly.

24. The method of claim 22, wherein a plurality of spacers are provided extending from the contact area to contact the mirror pane.

* * * * *